2 Sheets—Sheet 1.

W. J. WALKER.

CAR COUPLING.

No. 11,353. Reissued July 25, 1893.

Witnesses
James J. O'Donohoe
Jas. B. Crumpsley

Inventor
William J. Walker.
By his Attorneys
Keller & Starek

2 Sheets—Sheet 2.

W. J. WALKER.

CAR COUPLING.

No. 11,353. Reissued July 25, 1893.

Witnesses

James J. O'Rourke

Jno B. Dempsey

Inventor

William J. Walker.

By his Attorneys

Keller & Starek

UNITED STATES PATENT OFFICE.

WILLIAM J. WALKER, OF ST. LOUIS, MISSOURI, ASSIGNOR, BY DIRECT AND MESNE ASSIGNMENTS, TO THE WALKER AUTOMATIC CAR COUPLER MANUFACTURING COMPANY, OF EAST ST. LOUIS, ILLINOIS.

CAR-COUPLING.

SPECIFICATION forming part of Reissued Letters Patent No. 11,353, dated July 25, 1893.

Original No. 465,300, dated December 15, 1891. Application for reissue filed April 12, 1893. Serial No. 470,126.

*To all whom it may concern:*

Be it known that I, WILLIAM J. WALKER, of St. Louis, Missouri, have invented certain new and useful Improvements in Car-Couplers, of which the following is a full, clear, and exact description, reference being had to the accompanying drawings, forming a part hereof.

My invention has relation to improvements in car couplers and consists in the novel arrangement and combination of parts more particularly set forth in the specification and pointed out in the claims.

Figure 1:
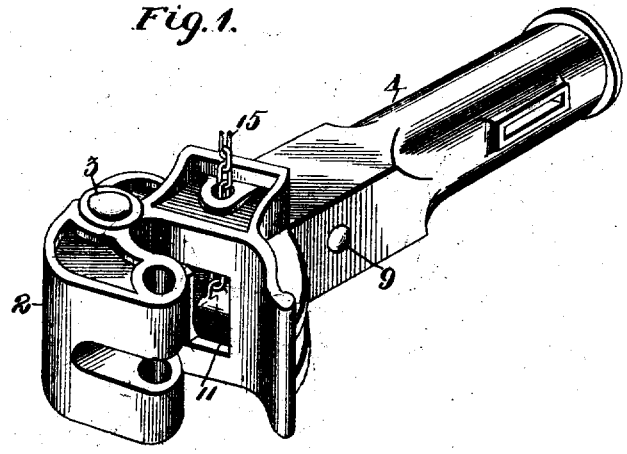
Figure 2:
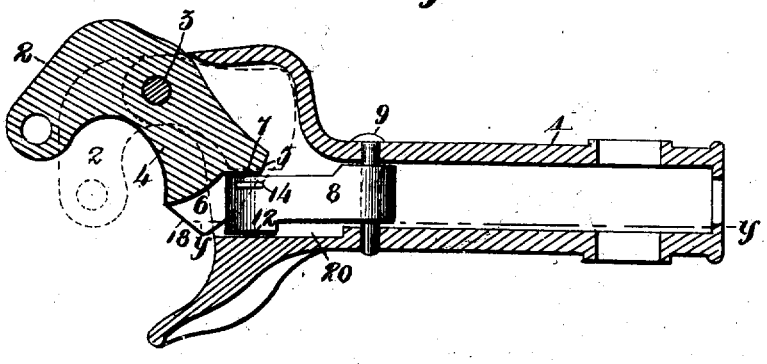
Figure 3:
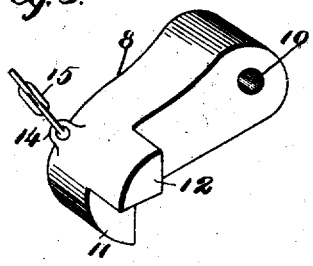
Figure 4:
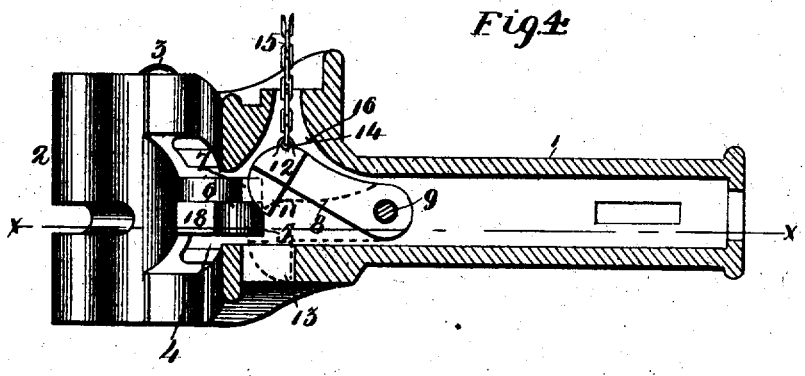
Figure 5:
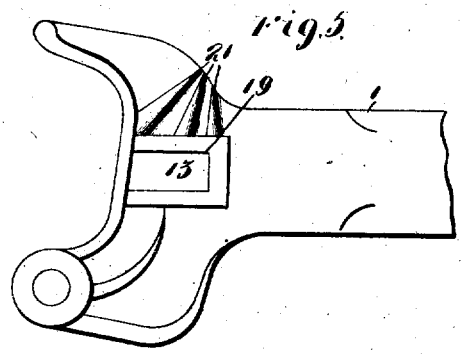

In the drawings, Figure 1 is a perspective view of a car coupler embodying my invention. Fig. 2 is a sectional plan view of the same with the hook swung open, the section being taken on the line *x—x* of Fig. 4. Fig. 3 is a detail perspective view showing an improved locking device on an enlarged scale. Fig. 4 is a sectional side elevation of the coupler with the knuckle swung open, the section being taken on the line *y—y* of Fig. 2; and Fig. 5 is a plan view of the under side of the drawhead, the knuckle being removed therefrom.

The object of my invention is to provide a novel and simplified construction in that class of car couplers commonly known as the "Janney type," whereby greater strength in the locking device will be brought about and the general operation of the device will be improved.

A further object is to strengthen and improve the operation of the knuckle and the portion of the drawhead which co-operates therewith.

Heretofore the knuckles in this class of couplers have been greatly weakened near the point at which they are attached to the drawhead by being provided with a recess or shoulder for limiting the outward movement of said knuckles. This objection as well as others is obviated by my improved construction which I will now proceed to describe.

Referring to the drawings, 1 represents the drawbar the rear portion of which is of the usual construction and adapted to be secured to the timbers of the car in a well known manner. The drawhead of the same in its general outward appearance resembles that of the Janney type of coupler, and my improved coupler is designed to couple with the ordinary Janney coupler whenever it becomes necessary.

2 represents the rotary knuckle which approximates the ordinary shape and is attached to the forward end of the drawhead by means of a vertical pin 3, which allows it to partially rotate between ears cast upon the drawhead.

4 represents the tail end of the knuckle which is extended rearwardly a considerable distance and made longer than the tail end of the usual knuckle, and its rear extremity is slightly curved as indicated by the surface 5 to conform to the rounded curvature of the interior of the drawhead when the knuckle is closed. The curvature of that end of the knuckle however, is not essential. A recess or cut-away portion in the tail end of the knuckle forms a surface 6 preferably flat which supports the free end of the locking device so long as the knuckle is in an open position, or partially open; said surface has a limiting stop or shoulder 7, which latter is adapted to come in contact with one side of the locking device and thereby limit the movement of said knuckle when swung outwardly as will appear hereinafter.

8 represents the locking device which is of such construction as to afford great strength, to wit: It is pivoted at its rear end to the drawhead in any suitable manner so that its forward or free end may move up and down in a vertical plane; but preferably its rear end is pivotally mounted upon a pin 9 passing through an aperture 10, and its forward end is provided with two projections 11 and 12 respectively, each cast integral with the body of the locking device, so that the projection 11 will engage an opening or bearing 13 formed in the bottom of the drawhead, and also rest on the flat supporting surface 6 formed upon the tail end of the knuckle when the latter is open or in a partially open position. The projection 12 on said locking device is adapted to form a stop for the same and limit its downward movement by coming in contact with the internal surface of the lower walls of the drawhead, and said projection 12 is also adapted to form a stop to limit the lateral movement of said locking device as will also appear farther on.

Upon the upper surface of the free end of the locking device 8 is a perforated ear 14 to which is attached a chain 15, which latter passes upwardly through a flared or funnel-shaped passage 16, so that its upper end will project above the upper surface of the drawhead for the purpose of elevating the free end of the locking device when it is desired to release the knuckle in uncoupling. This flared passage permits plenty of room for the operation of the chain or other device by means of which the locking device is raised or elevated, and it also permits the free end thereof to pass upwardly thereinto. (See Fig. 4.)

The operation is as follows: The normal locked position of the parts is that shown in Fig. 1, wherein the locking device 8 is shown at the limit of its downward movement with the projection 11 projecting downwardly through the aperture 13 in the bottom of the drawhead, and the projection (not shown in Fig. 1) resting upon the lower internal surface of the drawhead. When a strain is imposed upon the knuckle 2 (a draft strain) it should be clear that the surface 18 on the tail end of the said knuckle will bear against the side of the locking device which is opposite the projection 12, and thereby the said strain will be transmitted to the side inner wall 19 of the aperture 13 by reason of the projection 11 bearing thereagainst, and a portion of said strain will be transmitted to the side wall 20 of the drawhead by reason of the projection 12 bearing thereagainst. In this way the strain is distributed in two different parts of the drawhead, obviating in a great measure any liability of either part to be broken. For the purpose of strengthening the side 19 of the aperture 13 against which strain comes, I provide a series of ribs 21 which is cast upon the under side of the drawhead and extend laterally from the side of said aperture to the side of the drawhead. (See Fig. 5.) When the knuckle 2 is in the position shown in Figs. 2 and 4, the locking device 8 is supported by the flat supporting surface 6 upon the tail end of the knuckle in position ready to be dropped when a coupling is to be made. It will be observed that the locking device 8 is always supported in this position, except after a coupling has been made so that there is no occasion for the chain 15 to drop down within the opening in the drawhead and be caught between the locking device and the walls of the drawhead, which has occurred in many cases in other car couplers heretofore. It will also be observed that the knuckle 2 is limited in its outward movement by means of the shoulder 7 coming into contact with the side of the locking device that is opposite the projection 12 thereby obviating any necessity for forming a stopping notch or recess in said knuckle, which has been done heretofore and, as before stated, has greatly weakened the knuckle and rendered it liable to breakage at the point where such recess was formed. It will further be observed that the aperture 13 in the bottom of the drawhead is adapted to act as an exit passage for all dirt and accumulations which might otherwise be deposited upon the interior of the drawhead. The movement of the tail end of the knuckle and the movement of the locking device 8 tends to keep the interior of the drawhead clear of all accumulations, they being automatically discharged through the aperture 13, thereby preventing all interference with the proper operation of said parts at all times.

Having described my invention, what I claim is—

1. The combination of a drawhead, a knuckle 2 adapted to swing in a horizontal plane and pivoted to said drawhead, a locking device 8 pivoted at its rear end within the drawhead; the tail end of the knuckle having a rounded surface 5 conforming to the inner wall of the drawhead, a flat supporting surface 6, said surface 6 supporting the free end of the locking device when the knuckle is in an uncoupled position, and means for elevating the locking device after it has dropped to the limit of its downward movement substantially as set forth.

2. In a car coupler, the improved locking device for hooks of the Janney type, the same having an aperture 10 in one end by means of which it is adapted to be pivoted to the drawhead and its forward end provided with two projections 11 and 12, respectively, each cast integral with the body of the locking device, so that the projection 11 may engage an opening in the bottom of the drawhead and also be engaged by the tail end of the knuckle, and whereby the projection 12 may form a stop and limit the downward movement of the free end of the locking device by coming in contact with the internal surface of the lower wall of the drawhead and also form a stop to limit the lateral movement of the locking device, substantially as set forth.

3. In a car coupler, the combination of a drawhead 1, having a flared or funnel shaped passage 16 formed in its upper wall and communicating with the interior of the drawhead, a knuckle 2 pivoted to said drawhead, a locking device 8, mounted within the drawhead and pivoted at the rear end of the same in the rear of said flared passage 16, a chain 15, connected to the free end of the locking device and passing upwardly through said flared passage 16, the free end of said locking device adapted to be elevated into said flared passage, and means for limiting the downward movement of the free end of the locking device, substantially as set forth.

In testimony whereof I affix my signature in the presence of two witnesses.

WILLIAM J. WALKER.

Witnesses:
JAMES J. O'DONOHOE,
EMIL STAREK.